March 3, 1936. M. PRÜSS 2,033,006
SLUDGE DIGESTION CHAMBER
Filed Jan. 15, 1932
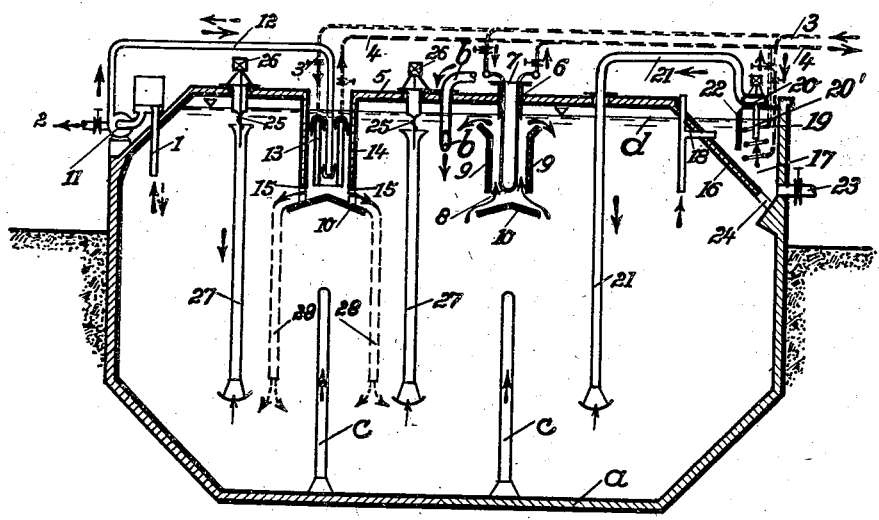
Inventor:
Max Prüss
Attorney:

Patented Mar. 3, 1936

2,033,006

UNITED STATES PATENT OFFICE 2,033,006

SLUDGE DIGESTION CHAMBER

Max Prüss, Essen, Germany

Application January 15, 1932, Serial No. 586,938
In Germany January 15, 1931

6 Claims. (Cl. 210—2)

The present invention relates to chambers serving for the decomposition of sludge and has more particularly reference to means for directly heating such chambers.

In order to directly heat sludge digestion chambers heating coils have been provided hitherto rigidly mounted in the chamber. This arrangement, however, suffers from the drawback that only low water temperatures can be employed owing to the fact that with higher temperatures the sludge sticks to the heating pipes and prevents further passage of the heat. Furthermore, cleaning of the pipes and their attendance is only possible after complete emptying of the chamber and expulsion of the gases. Because of the long germination period of a digestion chamber, especially with small installations that comprise only one chamber, these operations result in serious disadvantages as they prevent continuous operation so that this mode of heating is employed only rarely.

It has further been proposed to interpose a heating device in the pressure pipe of a sludge circulating pump disposed outside the digestion chamber. In such an arrangement, however, the heating device is exposed to corrosion and incrustation by the sludge. Therefore an indirect heating of the chamber has been proposed by introducing hot water immediately in the sludge or by preheating the fresh sludge to be supplied to the chamber. In the former method a great portion of the heat introduced is lost uselessly with the heating water which is drawn off again while in the other method a special boiler is required for the preheating of the fresh sludge outside of the digestion chamber which boiler could be saved if the sludge were heated immediately within the digestion chamber.

Now my present invention has for its object means for directly heating the sludge within the digestion chamber and for overcoming all the drawbacks hereinbefore mentioned. I achieve this object by arranging the heating device in such a manner that it hangs freely in the chamber and can be removed independently of the cover thereof.

In order to obtain a satisfactory circulation of the sludge water past the heating device, my invention further comprises the arrangement of the heating bodies within a frame or jacket which projects from above into the digestion chamber down to the liquid level therein and is in communication with the chamber at a point below the liquid level therein. By arranging these communications in superposition, an automatic circulation of the sludge water is obtained, due to the buoyancy of the hot water, past the heating bodies, the sludge water entering the jacket through the lower apertures thereof, being heated within the jacket while passing past the heating bodies and in this preheated state leaving the jacket through the upper apertures. In lieu of this arrangement a positive circulation of the sludge water may be provided by means of a pump which is disposed and operates either so as to suck the cold sludge water from the chamber or to press the water preheated by the heating bodies into the chamber.

In order that my invention may be clearly understood and readily carried into effect, a sludge digestion chamber is illustrated in the accompanying drawing in a vertical section and shows several embodiments of heating devices designed in accordance with my invention by way of example.

In this drawing a denotes a sludge digestion chamber which may have any desired suitable shape. The fresh sludge is fed to the chamber through one or more conduits b, while the mature sludge is drawn off periodically through one or more conduits c, the sludge water displaced by the fresh sludge supplied flowing off through a conduit 1, 2.

One or more heating appliances are disposed according to my invention in the chamber a which comprise heating bodies fed by hot water or the like and projecting from above into the chamber and the liquid therein. These heating bodies are further arranged so as to be removed independently of and separately from the cover of the chamber and may have any suitable design, structure and disposition, the drawing illustrating three embodiments only by way of example.

The embodiment illustrated near the center of chamber a comprises a frame or socket 6 fitted in the cover 5 of the chamber and gas-tightly closed by a cover plate 7 to which heating pipes 8 are fixed. The pipes 8 project into the contents of the chamber and are connected to a hot water feed conduit 3 and a return conduit 4 so that hot water or the like is in permanent circulation through the heating pipes 8. The latter are surrounded at a suitable distance by vertical walls or jackets 9 which terminate at their tops below the level d of the sludge. At a certain distance below the lower end of the jacket 9 is disposed a roof-shaped body 10. The sludge water enters the jacket 9 from below between the lower edge thereof and the roof 10, is heated by passing past the pipes 8 and leaves the jacket 9 at the top, as indicated by the arrows. During this circulation the roof 10 prevents flocks or cakes of sludge from rising from the lower portion of the chamber and reaching the pipes 8 so that in the extreme case only very small quantities of sludge can deposit thereon. When they need to be cleaned the pipes 8 can be withdrawn from the chamber separately or in groups, after removal of cover plate 7, without interrupting the process of decomposition in the chamber during this cleaning operation. When the socket 6 is of a length such as to extend somewhat into the liquid, no gases can escape from the chamber upon removing the cover plate 7.

Instead of effecting the circulation of the liquid past the heating bodies merely by the buoyancy of the hot water, a more powerful circulation may be brought about by means of a pump 10 which is arranged so as to suck either the cold or the heated sludge water.

Another embodiment of the heating appliance according to the invention is illustrated in the left-hand portion of the drawing in which a pump 15 is provided to suck the cold sludge water. 13 denotes the heating body which in this embodiment is formed by a hollow cylindrical body connected to the hot water feed pipe 3 and return pipe 4, as indicated by arrows. The heating cylinder 13 extends into the liquid through a sufficiently wide aperture provided in the cover 5 which has an extension forming a jacket 14 and likewise extending into the liquid, the heating cylinder 13 being surrounded by the jacket 14. At a certain distance below the latter is arranged again a roof-shaped body 10 which deflects rising sludge cakes from the heating cylinder 13. The pressure pipe 12 of a pump 11 extends into the heating cylinder 13 through which pipe the cold sludge water is driven through the suction pipe 1 into the free inner space of cylinder 13, this water then rising within the latter as indicated by arrows and under the action of the following water flows as heating water over the upper edge of cylinder 13 into the annular space between the latter and jacket 14.

In order to feed the hot water to the chamber at a lower point, in lieu of the entrance passages 15 pipes 28 indicated in dot and dash lines may be connected to the lower end of jacket 14 through which pipes the water driven by the pump 11 into the jacket and heated therein enters the digestion chamber at a lower level.

Furthermore, instead of disposing the heating body or bodies in the digestion chamber proper, they may be arranged in special chambers separated from the main chamber and communicating therewith by passages. An example of this arrangement is illustrated in the drawing at the right-hand upper corner of the chamber a. A chamber 17 is separated here by a partition 16 from the main digestion chamber and communicates with the latter by a lower passage 24. A dip pipe 18 is further provided which connects the chamber 17 with the main chamber. In the chamber 17 is arranged a heating body 19 in a manner so as to be removed or exchanged from above, which is connected to the hot water feed pipe 3 and return pipe 4. Finally, the suction pipe 20' of a pump 20 extends into the chamber 17 and serves to suck the sludge water heated by the body 19 from chamber 17. This water is then driven by the pump through a long dip pipe 21 into the lower portion of chamber a. The quantity of water sucked off by the pump is replaced by a corresponding quantity of cold water which enters chamber 17 through the dip pipe 18 from main chamber a, a partition 22 provided in chamber 17 serving to lead this water to the lower portion of chamber 17. Any sludge which is carried along by the water may be drawn off from chamber 17 through a drain pipe 23 or flows automatically back to chamber a through the passage 24. If a pipe 23 is provided, the passage 24 may be dispensed with.

The heating and circulating system described above may be modified in so far as the pump 11 may be reversed so that hot water is drawn off from chamber 17 through pipe 1 to chamber a. In this case it is of advantage to dispose the pump 11 like the pump 20 of the last-described embodiment immediately above the suction pipe, to have the latter as short as possible.

In the event that the water circulation brought about by the pumps does not suffice to lead the warm sludge water collecting at the surface down to the lower portion of chamber a, axial pumps 25 may be provided which are driven each by a motor 26 mounted on the cover 5 and suck the sludge water from the lower layers to the upper ones through pipes 27 rigidly fixed in chamber a. In this way a uniform heating of the whole contents of the digestion chamber is obtained.

What I claim and desire to secure by Letters Patent is:—

1. In a digestion plant for the treatment of sludge, which includes a tank in which the sludge is disposed with a layer of supernatant material thereabove, a cover on said tank, heating bodies extending downwardly into the supernatant layer of sludge material and adapted to be removed from the tank independently of the cover, and means for mixing the whole content of the tank.

2. In a digestion plant for the treatment of sewage sludge, which includes a tank in which the sludge is disposed with a layer of supernatant material thereabove, a cover on said tank, heating bodies extending downwardly into the supernatant layer of said sludge material and adapted to be removed from the tank independently of the cover, jackets open at the bottom and top and surrounding said heating bodies, said jackets extending from above into the supernatant layer of said sludge material, said jackets communicating at their upper and lower ends with the tank below the level of the said supernatant layer, and means for mixing the whole content of the tank.

3. In a digestion plant as claimed in claim 2, a pump adapted to circulate the supernatant layer of material past said heating bodies.

4. In a digestion plant as claimed in claim 2, said last means being spaced laterally from said heating bodies.

5. In a digestion plant as claimed in claim 2, a pump adapted to circulate the upper layer of sewage material past said heating bodies, and at least one axial pump adapted to assist in circulating said supernatant layer of material.

6. In a digestion plant for the treatment of sludge, which includes a tank in which the sludge is disposed with a layer of supernatant material thereabove, a cover on said tank, heating bodies extending downwardly into the supernatant layer of sludge material and adapted to be removed from the tank independently of the cover, and means for conducting the contents of the upper part of the tank to the lower part thereof.

MAX PRÜSS.